US009343742B2

(12) United States Patent
Kihara et al.

(10) Patent No.: US 9,343,742 B2
(45) Date of Patent: May 17, 2016

(54) NICKEL HYDRIDE SECONDARY BATTERY

(71) Applicant: FDK TWICELL CO., LTD., Takasaki-shi (JP)

(72) Inventors: Masaru Kihara, Takasaki (JP); Akira Saguchi, Takasaki (JP); Masaaki Takei, Takasaki (JP); Takeshi Ito, Takasaki (JP); Yuzo Imoto, Takasaki (JP)

(73) Assignee: FDK CORPORATION, Minato-ku, Tokyo (JP)

( * ) Notice: Subject to any disclaimer, the term of this patent is extended or adjusted under 35 U.S.C. 154(b) by 73 days.

(21) Appl. No.: 14/066,414

(22) Filed: Oct. 29, 2013

(65) Prior Publication Data

US 2014/0120411 A1 May 1, 2014

(30) Foreign Application Priority Data

Oct. 30, 2012 (JP) .................................. 2012-239006

(51) Int. Cl.
| | |
|---|---|
| *H01M 4/62* | (2006.01) |
| *H01M 4/24* | (2006.01) |
| *H01M 4/38* | (2006.01) |
| *C01B 3/00* | (2006.01) |
| *H01M 10/34* | (2006.01) |
| *H01M 10/28* | (2006.01) |
| *H01M 4/02* | (2006.01) |

(52) U.S. Cl.
CPC ............... *H01M 4/62* (2013.01); *C01B 3/0057* (2013.01); *H01M 4/242* (2013.01); *H01M 4/383* (2013.01); *H01M 4/628* (2013.01); *H01M 10/345* (2013.01); *H01M 4/622* (2013.01); *H01M 10/286* (2013.01); *H01M 2004/027* (2013.01); *Y02E 60/124* (2013.01); *Y02E 60/327* (2013.01)

(58) Field of Classification Search
CPC ........................................................ H01M 4/62
USPC ......................................................... 429/163
See application file for complete search history.

(56) References Cited

U.S. PATENT DOCUMENTS

| | | | |
|---|---|---|---|
| 2009/0047576 A1 | 2/2009 | Okabe et al. | |
| 2009/0061317 A1* | 3/2009 | Tanaka et al. | 429/218.2 |

FOREIGN PATENT DOCUMENTS

| | | |
|---|---|---|
| EP | 0 853 346 A1 | 7/1998 |
| JP | 10-012231 | 1/1998 |
| JP | H10 92422 A | 4/1998 |
| JP | 2000-012075 A | 1/2000 |

OTHER PUBLICATIONS

"Aqualon Sodium Carboxymethylcellulose—Physical and Chemical Properties", Dec. 12, 1999, http://www.ashland.com/Ashland/Static/Documents/AAFI/PRO-250-10H__Aqualon__CMC.pdf.
Toagosei Co. et al., "ARONVIS—Sodium Polyacrylate Thickener/Gelling Agent", Oct. 1, 2009 pp. 1-6, http://dfpcorec-p.internal.epo.org/wf/storage/147B0A539CA000400A1/originalPdf.

(Continued)

*Primary Examiner* — Stewart Fraser
(74) *Attorney, Agent, or Firm* — Marshall, Gerstein & Borun LLP (57) ABSTRACT

A nickel hydride secondary battery houses an electrode group including a positive electrode and a negative electrode which are overlapped with each other via a separator with an alkaline electrolyte solution, the negative electrode includes a hydrogen absorbing alloy, a negative-electrode additive agent, a thickening agent, and a conductive material, and the negative-electrode additive agent includes at least one selected from calcium fluoride, calcium sulfide, and calcium chloride.

16 Claims, 1 Drawing Sheet

(56) References Cited

OTHER PUBLICATIONS

"Klucel TM: Hydroxypropylcellulose, Chemical and Physical Properties", Jan. 1, 1986, pp. 1-35, http://legacy.library.ucsf.edu/documentStore/c/n/f/cnf81a99/Scnf81a99.pdf.

European Communication pursuant to Article 94(3) EPC from European Application No. 13189550.0, dated Aug. 15, 2014, 5 pages.

Extended European Search Report for European Patent Application No. 13 18 9550, dated Jan. 30, 2014.

* cited by examiner

NICKEL HYDRIDE SECONDARY BATTERY

BACKGROUND OF THE INVENTION

1. Field of the Invention

The present invention relates to a nickel hydride secondary battery.

2. Description of the Related Art

From the viewpoint that a nickel hydride secondary battery has high capacity and excels in environmental safety compared to a dry-cell battery or a nickel-cadmium secondary battery, the nickel hydride secondary battery has been used for a variety of applications such as various portables and a hybrid electric vehicle. The capacity means quantity of electricity that can be derived from the battery.

A hydrogen absorbing alloy used for a negative electrode of the nickel hydride secondary battery has a feature capable of absorbing a large amount of hydrogen gas, and contributes to increase in capacity of the nickel hydride secondary battery.

The negative electrode embedded in the nickel hydride secondary battery is generally manufactured by a slurry method. According to the slurry method, firstly, hydrogen absorbing alloy powder and conductive material powder are dispersed in water as a solvent, and further, thickening agent powder is injected therein, and these are kneaded to prepare a negative-electrode mixture slurry. The obtained negative-electrode mixture slurry is applied to a negative-electrode substrate of a metal porous body or the like. After that, the negative-electrode substrate supporting the negative-electrode mixture slurry undergoes a drying step, a rolling step, and a cutting step to be formed into the negative electrode (for example, refer to Unexamined Japanese Patent Publication No. 10-012231). In the slurry method, a thickening agent is used to adjust the negative-electrode mixture slurry to have an appropriate viscosity such that the negative-electrode mixture slurry is not dripped from the negative-electrode substrate in manufacturing processes.

While having high capacity, a conventional nickel hydride secondary battery has large self-discharge. Thus, remaining capacity decreased after having been left for a long time, and the battery needed to be charged just before use.

Therefore, in order to improve self-discharge characteristics, various types of research have been conducted on the nickel hydride secondary battery. As a result, a negative-electrode additive agent for suppressing self-discharge was added to a negative electrode, and a self-discharge suppression-type nickel hydride secondary battery was developed. It is to be noted that, when a degree of remaining capacity after a battery has been left for a long time is defined as self-discharge characteristics, the expression of self-discharge characteristics are higher or better means that remaining capacity after having been left for a long time is closer to capacity in the case of full charge.

The self-discharge suppression-type battery as described above has the advantage in that, if a user charges the battery in advance, occurrence frequency of situations requiring recharge just before use can be reduced because the reduced amount of the remaining capacity after having been left for a long time is small. By utilizing the advantage, the self-discharge suppression-type nickel hydride secondary battery is an excellent battery which has both of ease of use as if it were a dry-cell battery and capacity equal to or higher than that of a dry-cell battery.

The above-described negative-electrode additive agent is used by being injected in the negative-electrode mixture slurry. However, while having a property of suppressing self-discharge of the battery, the negative-electrode additive agent has also a property of inhibiting the function of the thickening agent in the negative-electrode mixture slurry. Thus, the negative-electrode mixture slurry to which the above-described negative-electrode additive agent is added does not have a sufficient thickening property by the thickening agent, and the viscosity of the negative-electrode mixture slurry significantly decreases. As a result, when applying the negative-electrode mixture slurry to the negative-electrode substrate, the negative-electrode mixture slurry is dripped and it becomes difficult to manufacture the negative electrode.

Therefore, the amount of the thickening agent is generally increased so as to increase the viscosity of the negative-electrode mixture slurry such that the negative-electrode mixture slurry can be successfully supported on the negative-electrode substrate. When the amount of the thickening agent increases in this manner, the viscosity of the negative-electrode mixture slurry increases, and the dripping of the slurry is suppressed, and thus, the negative electrode can be manufactured as is conventionally done. That is, when the negative-electrode additive agent for suppressing self-discharge is added to the negative-electrode mixture slurry, the amount of the thickening agent needs to be increased compared to ever before.

However, since the thickening agent does not directly contribute to the battery reaction, when the amount of such a thickening agent increases, the amount of the hydrogen absorbing alloy contributing to the battery reaction relatively decreases, and a value of maximum capacity of the battery is lowered. That is, the nickel hydride secondary battery to which the negative-electrode additive agent for suppressing self-discharge is added can improve self-discharge characteristics, but capacity of the battery has no choice but to be sacrificed to some extent with increase in the thickening agent.

As just described, although the conventional self-discharge suppression-type nickel hydride secondary battery has capacity equal to or higher than that of a dry-cell battery, the value remains insufficient. That is, in the nickel hydride secondary battery, both of improvement in self-discharge characteristics and increase in capacity of the battery have not been sufficiently achieved yet.

SUMMARY OF THE INVENTION

The present inventors made extensive research on the relationship between the negative-electrode additive agent effective for suppressing self-discharge and the viscosity of the negative-electrode mixture slurry. In the research, the present inventors found that the conventionally-used negative-electrode additive agent shows alkalinity when being dissolved in water as a solvent and the function for increasing the viscosity of the slurry of the thickening agent is inhibited under an alkaline environment. It is to be noted that, in the present invention, alkalinity means the hydrogen-ion exponent (pH) of more than 8, neutrality means pH of 6 or more and 8 or less, and acidity means pH of less than 6.

In view of the finding as described above, the present inventors conceived the present invention so as to achieve both of increase in capacity of a battery and improvement in self-discharge characteristics by using a negative-electrode additive agent not showing alkalinity when being dissolved in water.

That is, according to the present invention, a nickel hydride secondary battery including a container and an electrode group housed in the container with an alkaline electrolyte solution in an air-tightly closed state, in which the electrode group is composed of a positive electrode and a negative electrode which are overlapped with each other via a separator, the negative electrode includes a hydrogen absorbing alloy, a negative-electrode additive agent, a thickening agent, and a conductive material, and the negative-electrode additive agent includes at least one selected from calcium fluoride, calcium sulfide, and calcium chloride, is provided.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Figure 1:
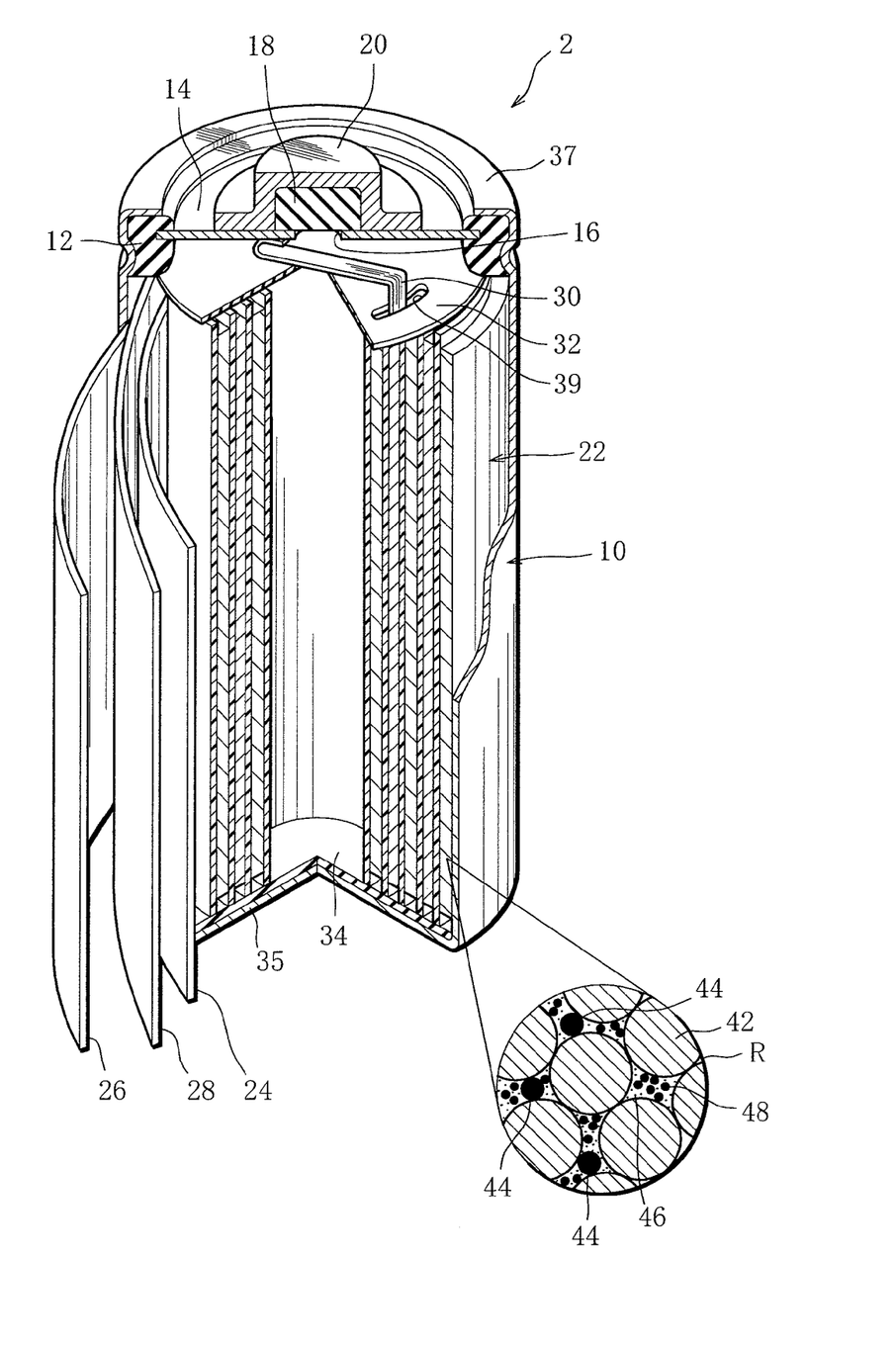
FIG. 1 is a partially cutaway perspective view of a nickel hydride secondary battery according to one embodiment of the present invention.

Hereinafter, a nickel hydride secondary battery (hereinafter, referred to as a battery) 2 according to the present invention will be described with reference to the drawing.

Although the battery 2 to which the present invention is applied is not particularly limited, for example, the case where the present invention is applied to the AA sized cylindrical battery 2 shown in FIG. 1 will be described as an example.

As shown in FIG. 1, the battery 2 includes an outer can (container) 10 whose upper end is opened and which has a cylindrical shape with a bottom. The outer can 10 has electrical conductivity, and its bottom wall 35 functions as a negative-electrode terminal. A conductive disc-shaped cover plate 14 and a ring-shaped insulating gasket 12 surrounding the cover plate 14 are arranged in the opening of the outer can 10, and by caulking an opening rim 37 of the outer can 10, the insulating gasket 12 is fixed to the opening rim 37 of the outer can 10. More specifically, the cover plate 14 and the insulating gasket 12 cooperate with each other to air-tightly close the opening of the outer can 10.

The cover plate 14 has a center through-hole 16 in the center, and a rubber valve body 18 for closing the center through-hole 16 is arranged on the outer surface of the cover plate 14. Furthermore, a positive-electrode terminal 20 having a cylindrical shape with a flange is fixed on the outer surface of the cover plate 14 to cover the valve body 18, and the positive-electrode terminal 20 presses the valve body 18 against the cover plate 14. It is to be noted that a gas release hole not shown in the drawing is provided in the positive-electrode terminal 20.

Normally, the center through-hole 16 is air-tightly closed by the valve body 18. In contrast, when gas is generated inside the outer can 10 and the inner pressure increases, the valve body 18 is compressed by the inner pressure to open the center through-hole 16 so that the gas is released to the outside from the outer can 10 through the center through-hole 16 and the gas release hole of the positive-electrode terminal 20. That is, the center through-hole 16, the valve body 18, and the positive-electrode terminal 20 form a safety valve for the battery.

An electrode group 22 is housed in the outer can 10. The electrode group 22 is composed of a positive electrode 24, a negative electrode 26, and a separator 28 all of which have a belt shape, and these are wound in whorl with the separator 28 sandwiched between the positive electrode 24 and the negative electrode 26. That is, the positive electrode 24 and the negative electrode 26 are overlapped with each other via the separator 28. The outermost circumference of the electrode group 22 is formed by a part of the negative electrode 26 (outermost circumference part), and is in contact with the inner circumference wall of the outer can 10. That is, the negative electrode 26 and the outer can 10 are electrically connected to each other.

In the outer can 10, a positive-electrode lead 30 is arranged between one end of the electrode group 22 and the cover plate 14. More specifically, one end of the positive-electrode lead 30 is connected to the inner end of the positive electrode 24 and the other end of the positive-electrode lead 30 is connected to the cover plate 14. Thus, the positive-electrode terminal 20 and the positive electrode 24 are electrically connected to each other via the positive-electrode lead 30 and the cover plate 14. It is to be noted that a circular insulating member 32 is arranged between the cover plate 14 and the electrode group 22, and the positive-electrode lead 30 extends through a slit 39 provided in the insulating member 32. In addition, a circular insulating member 34 is arranged between the electrode group 22 and the bottom of the outer can 10.

Furthermore, a predetermined amount of an alkaline electrolyte solution (not shown in the drawing) is injected in the outer can 10. The electrode group 22 is impregnated with the alkaline electrolyte solution so that a charge-discharge reaction between the positive electrode 24 and the negative electrode 26 proceeds. The alkaline electrolyte solution is not particularly limited as long as it is used for a nickel hydride secondary battery. As the preferred alkaline electrolyte solution, for example, an alkaline electrolyte solution mainly containing NaOH as a solute is used. More specifically, examples of the alkaline electrolyte solution include a sodium hydroxide aqueous solution. The solute of the alkaline electrolyte solution may contain only NaOH or may contain, for example, at least one of KOH and LiOH in addition to NaOH as long as NaOH is mainly contained. When KOH or LiOH are also contained as the solute of the alkaline electrolyte solution, the amount of NaOH is made to be larger than that of KOH or LiOH. A battery using such an alkaline electrolyte solution mainly containing NaOH has good self-discharge characteristics.

As a material for the separator 28, for example, polyamide fiber non-woven fabric, and polyolefin fiber non-woven fabric such as polyethylene and polypropylene, to which a hydrophilic functional group is applied, can be used. More specifically, non-woven fabric mainly made from polyolefin fiber, to which a sulfone group is given by sulfonation treatment, is preferably used. The sulfone group is given by treating non-woven fabric with acids having a sulfate group, such as sulfuric acid and fuming sulfuric acid. A battery using such a separator including fiber having a sulfone group has good self-discharge characteristics.

The positive electrode 24 is composed of a conductive positive-electrode substrate having a porous structure, and a positive-electrode mixture supported in holes of the positive-electrode substrate.

As such a positive-electrode substrate, for example, nickel-plated reticular, spongy, or fibrous metal body, or nickel foam can be used.

The positive-electrode mixture contains positive-electrode active material particles, a conductive material, a positive-electrode additive agent, and a binding agent. As well as binding the positive-electrode active material particles, the conductive material, and the positive-electrode additive agent, the binding agent functions to bind the positive-electrode mixture to the positive-electrode substrate. As the binding agent, for example, carboxymethylcellulose, methylcellulose, PTFE (polytetrafluoroethylene) dispersion, HPC (hydroxypropylcellulose) dispersion and the like can be used.

The positive-electrode active material particles are nickel hydroxide particles or higher-order nickel hydroxide particles. It is to be noted that at least one of zinc, magnesium, and cobalt is preferably dissolved in these nickel hydroxide particles.

As the conductive material, for example, one or two or more selected from cobalt compounds such as cobalt oxide (CoO) and cobalt hydroxide ($Co(OH)_2$), and cobalt (Co) can be used. The conductive material is added to the positive-electrode mixture as necessary, and as a form of addition, in addition to the powder form, the conductive material may be contained in the positive-electrode mixture by the covering form for covering the surface of the positive-electrode active material.

The positive-electrode additive agent is added to improve positive electrode characteristics, and yttrium oxide, zinc oxide or the like can be used, for example.

The positive-electrode active material particles can be manufactured, for example, as follows.

Firstly, an aqueous solution of nickel sulfate is prepared. A sodium hydroxide aqueous solution is gradually added to the nickel sulfate aqueous solution to be reacted so that nickel hydroxide particles are deposited. In the case where zinc, magnesium, and cobalt are dissolved in the nickel hydroxide particles, nickel sulfate, zinc sulfate, magnesium sulfate, and cobalt sulfate are weighed so as to be a predetermined composition, and a mixed aqueous solution of them is prepared. While stirring the obtained mixed aqueous solution, a sodium hydroxide aqueous solution is gradually added to the mixed aqueous solution to be reacted so that the positive-electrode active material particles in which nickel hydroxide is mainly contained and zinc, magnesium, and cobalt are dissolved are deposited.

The positive electrode 24 can be manufactured, for example, as follows.

Firstly, a positive-electrode mixture slurry containing positive-electrode active material powder made from the positive-electrode active material particles obtained as described above, the conductive material, the positive-electrode additive agent, water, and the binding agent is prepared. The obtained positive-electrode mixture slurry is, for example, filled in a spongy nickel metal body to be dried. After the drying, the metal body in which the nickel hydroxide particles and the like are filled is rolled by a roller, and then, is cut out. Thus, the positive electrode 24 supporting the positive-electrode mixture is manufactured.

Next, the negative electrode 26 will be described.

The negative electrode 26 includes a belt-shaped conductive negative-electrode substrate (core body), and a negative-electrode mixture is supported in the negative-electrode substrate.

The negative-electrode substrate comprises a sheet-like metal material in which through-holes are distributed, and, for example, a punching metal sheet or a sintered substrate formed by die molding and sintering metal powder can be used. The negative-electrode mixture is filled in the through-holes of the negative-electrode substrate, and is also supported on both surfaces of the negative-electrode substrate in the form of layers.

As schematically shown in the circle R in FIG. 1, the negative-electrode mixture includes hydrogen absorbing alloy particles 42 capable of absorbing and releasing hydrogen as a negative-electrode active material, a negative-electrode additive agent 44, a thickening agent 46, and a conductive material 48.

Although a hydrogen absorbing alloy in the hydrogen absorbing alloy particles 42 is not particularly limited, for example, a rare earth-Mg-Ni hydrogen absorbing alloy containing a rare earth element, Mg, and Ni is preferably used. More specifically, the rare earth-Mg-Ni hydrogen absorbing alloy having a composition represented by a general formula: $Ln_{1-w}Mg_wNi_{x-y-y'}Al_yT_z$ . . . (I) is used. In the general formula (I), Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and indexes w, x, y, and z represent numbers satisfying $0<w<0.3$, $3.00 \le x \le 3.80$, $0.10 \le y \le 0.25$, and $0 \le z \le 0.1$, respectively. It is to be noted that the lanthanoid element represents specifically La, Ce, Pr, Nd, Pm, Sm, Eu, Gd, Tb, Dy, Ho, Er, Tm, Yb, and Lu.

The rare earth-Mg-Ni hydrogen absorbing alloy forms a so-called superlattice structure that is a $Ce_2Ni_7$-type structure in which an $AB_2$-type subunit and an $AB_5$-type subunit are combined and a crystal structure similar to this, and has both of the advantage in that absorbing and releasing of hydrogen is stable, which is a feature of an $AB_5$-type alloy, and the advantage in that the absorbing amount of hydrogen is large, which is a feature of an $AB_2$-type alloy. Therefore, since the above-described rare earth-Mg-Ni hydrogen absorbing alloy excels in the hydrogen absorbing ability, the obtained battery 2 becomes high capacity. Furthermore, pulverization due to absorbing and releasing of hydrogen of the above-described rare earth-Mg-Ni hydrogen absorbing alloy is unlikely to occur, thereby contributing to improvement in cycle lifetime characteristics of the battery 2. It is to be noted that if the composition ratio represented by the respective indexes in the above-described general formula (I) is satisfied, the obtained hydrogen absorbing alloy becomes the superlattice structure.

The hydrogen absorbing alloy particles 42 can be obtained, for example, as follows.

Firstly, metal raw materials are weighed so as to be a predetermined composition and are mixed, the mixture is melted in, for example, an induction melting furnace, and then, is cooled to form an ingot. Heat treatment for heating the obtained ingot at 900 to 1200° C. under an inert gas atmosphere for 5 to 24 hours is performed. After that, the ingot which has cooled to room temperature is pulverized under an inert gas atmosphere, and is classified into desired grain diameters by sieving to obtain the hydrogen absorbing alloy particles 42.

Next, the negative-electrode additive agent 44 includes at least one selected from calcium fluoride, calcium sulfide, and calcium chloride. These calcium compounds suppress self-discharge of the battery and contribute to improvement in self-discharge characteristics. In addition, since calcium fluoride, calcium sulfide, and calcium chloride have the property of not showing alkalinity even when being dissolved in water, they do not inhibit the thickening property of the thickening agent in a negative-electrode mixture slurry. In order to improve self-discharge characteristics of the battery, the additive amount of the negative-electrode additive agent 44 is preferably 0.1 to 1.0 parts by mass with respect to 100 parts by mass of the hydrogen absorbing alloy. This is because, when the additive amount of the negative-electrode additive agent 44 is less than 0.1 parts by mass, a sufficient effect in improving self-discharge characteristics cannot be obtained, and when it exceeds 1.0 parts by mass, the amount of the hydrogen absorbing alloy relatively decreases and increase in capacity of the battery is inhibited. It is to be noted that calcium fluoride, calcium sulfide, and calcium chloride have the above-described effect of suppressing self-discharge of the battery when being used alone or in combinations with each other.

Next, the thickening agent 46 functions to increase the viscosity of the negative-electrode mixture slurry such that the negative-electrode mixture slurry is successfully supported by the substrate. As the thickening agent 46, at least one selected from carboxymethylcellulose, sodium polyacrylate, and hydroxypropylcellulose is used. It is to be noted that carboxymethylcellulose, sodium polyacrylate, and hydroxypropylcellulose have the above-described effect of increasing the viscosity of the negative-electrode mixture slurry when being used alone or in combinations with each other. In order to control the viscosity of the negative-electrode mixture slurry to be an appropriate value, the additive amount of the thickening agent 46 is preferably 0.01 to 0.1 parts by mass, and more preferably 0.01 to 0.05 parts by mass with respect to 100 parts by mass of the hydrogen absorbing alloy. This is because, when the additive amount of the thickening agent 46 is less than 0.01 parts by mass, it becomes difficult to control the viscosity of the negative-electrode mixture slurry to be an appropriate value, and when it exceeds 0.1 parts by mass, the amount of the hydrogen absorbing alloy relatively decreases and increase in capacity of the battery is inhibited.

Next, the conductive material 48 functions to electrically connect the respective hydrogen absorbing alloy particles 42 to the framework of the negative-electrode substrate. As the conductive material 48, carbon black is preferably used. Carbon black is carbon microparticles having a diameter of about 3 to 500 nm and industrially manufactured with quality control, and excels in conductivity. Examples of typical carbon black include acetylene black, Ketjen and the like.

It is to be noted that the above-described negative-electrode mixture slurry may contain a binding agent as necessary. As well as binding the hydrogen absorbing alloy particles 42, the negative-electrode additive agent 44, and the conductive material 48 to each other, the binding agent functions to bind the negative-electrode mixture to the negative-electrode substrate. As the binding agent, a hydrophilic or hydrophobic polymer or the like can be used.

In addition, the negative electrode 26 can be manufactured, for example, as follows.

Firstly, the negative-electrode mixture slurry is prepared by kneading hydrogen absorbing alloy powder made from the hydrogen absorbing alloy particles, the negative-electrode additive agent, the thickening agent, the conductive material, the binding agent, and water. The obtained negative-electrode mixture slurry is applied to the negative-electrode substrate to be dried. After the drying, the negative-electrode substrate to which the hydrogen absorbing alloy particles and the like adhere is rolled by a roller and is cut out, thereby manufacturing the negative electrode 26.

The positive electrode 24 and the negative electrode 26 manufactured as described above are wound in whorl with the separator 28 provided therebetween so that the electrode group 22 is formed.

The electrode group 22 obtained in this manner is housed in the outer can 10. Subsequently, a predetermined amount of an alkaline electrolyte solution is injected into the outer can 10. After that, the outer can 10 housing therein the electrode group 22 and the alkaline electrolyte solution is sealed by the cover plate 14 including the positive-electrode terminal 20 so that the battery 2 according to the present invention can be obtained.

Due to a synergy effect by the combinations of the above-described respective components, the battery 2 of the present invention is a battery which has higher capacity and excels in self-discharge characteristics compared to ever before. More specifically, since the battery 2 of the present invention contains at least one selected from calcium fluoride, calcium sulfide, and calcium chloride as the negative-electrode additive agent, self-discharge characteristics of the battery are improved. Furthermore, since these negative-electrode additive agents do not show alkalinity when being dissolved in water, the thickening property of the thickening agent contained in the negative-electrode mixture slurry is not inhibited. Thus, the nature of the negative-electrode mixture slurry can be controlled without increasing the amount of the thickening agent even if the negative-electrode additive agent exists, and the negative electrode can be easily manufactured. Furthermore, since only a small amount of the thickening agent is required, the amount of the hydrogen absorbing alloy can be relatively increased, decrease in capacity of the battery is suppressed, and the battery with high capacity can be obtained. That is, the nickel hydride secondary battery obtained by the present invention is excellent because both of increase in capacity and improvement in self-discharge characteristics are achieved. Therefore, the battery 2 has the advantage in that, if a user charges the battery in advance, occurrence frequency of situations requiring recharge just before use can be reduced because the reduced amount of the remaining capacity after having been left for a long time is small, and the advantage in that the battery has high capacity.

EXAMPLES

1. Manufacture of Battery

Example 1

(1) Manufacture of Hydrogen Absorbing Alloy and Negative Electrode

Firstly, a first mixture containing 60 mass % of lanthanum, 30 mass % of cerium, 5 mass % of praseodymium, and 5 mass % of neodymium was prepared. The obtained first mixture, nickel, cobalt, manganese, and aluminum were weighed, and a second mixture having a ratio thereof of 1.00:3.90:0.60:0.40:0.35 at a molar ratio was prepared. The obtained second mixture was melted in an induction melting furnace to form an ingot. Next, heat treatment for heating the ingot at a temperature of 1000° C. under an argon gas atmosphere for 10 hours was performed, and a hydrogen absorbing alloy ingot having a composition of $La_{0.60}Ce_{0.30}Pr_{0.05}Nd_{0.05}Ni_{3.90}Co_{0.60}Mn_{0.40}Al_{0.35}$ was obtained. After that, the ingot was mechanically pulverized under an argon gas atmosphere to be sieved such that powder made from the hydrogen absorbing alloy particles remaining on between 400 mesh to 200 mesh was sorted out. The particle size distribution of the obtained hydrogen absorbing alloy particles was measured by a laser diffraction/scattering particle size distribution measuring device, and the average particle size of the hydrogen absorbing alloy particles at 50% convolution integration was 45 μm.

With respect to 100 parts by mass of the obtained hydrogen absorbing alloy powder, 0.01 parts by mass of sodium polyacrylate (Na polyacrylate) as the thickening agent, 1.0 parts by mass of acetylene black as the conductive material, 0.1 parts by mass of calcium fluoride as the negative-electrode additive agent, and 10 parts by mass of water were added to be kneaded so that the negative-electrode mixture slurry was prepared.

The hydrogen-ion exponent (pH) of the obtained negative-electrode mixture slurry was measured, and pH was 8.

To both surfaces of an iron perforated plate as the negative-electrode substrate, the negative-electrode mixture slurry was uniformly applied to have a constant thickness. It is to be noted that the perforated plate has a thickness of 60 μm and the surface thereof is nickel-plated.

After drying the negative-electrode mixture slurry, the perforated plate to which the hydrogen absorbing alloy powder and the like adhere was further rolled by a roller and was cut out so that the negative electrode 26 for an AA size containing the hydrogen absorbing alloy was manufactured. It is to be noted that the amount of the hydrogen absorbing alloy per one negative electrode is 9.0 g.

(2) Manufacture of Positive Electrode

Nickel sulfate, zinc sulfate, magnesium sulfate, and cobalt sulfate were weighed such that zinc is 3 mass %, magnesium is 0.4 mass %, and cobalt is 1 mass % with respect to nickel, these were added to a 1 N (normality) sodium hydroxide aqueous solution containing ammonium ions, and the mixed aqueous solution was adjusted. While stirring the obtained mixed aqueous solution, a 10 N (normality) sodium hydroxide aqueous solution was gradually added to the mixed aqueous solution to be reacted, and the hydrogen-ion exponent (pH) was stabilized at 13 to 14 during this reaction to generate nickel hydroxide particles in which nickel hydroxide is mainly contained and zinc, magnesium, and cobalt are dissolved.

The obtained nickel hydroxide particles were washed with ten times its volume of pure water three times, and then, were dehydrated and dried. It is to be noted that the obtained nickel hydroxide particles had a spherical shape having an average particle diameter of 10 μm.

Next, with respect to 100 parts by mass of the positive-electrode active material powder made from the nickel hydroxide particles manufactured as described above, 10 parts by mass of cobalt hydroxide powder was mixed, and furthermore, 0.5 parts by mass of yttrium oxide, 0.5 parts by mass of zinc oxide, and 40 parts by mass of a HPC dispersion solution were mixed to prepare the positive-electrode mixture slurry. Then, sheet-like nickel foam as the positive-electrode substrate was coated and filled with the positive-electrode mixture slurry. The nickel foam to which the positive-electrode mixture slurry adheres was dried and rolled by a roller. After the rolling process, the nickel foam to which the positive-electrode mixture adheres was cut out into a predetermined shape to form the positive electrode 24 for an AA size. The positive electrode 24 supports the positive-electrode mixture such that the positive electrode capacity is 2000 mAh.

(3) Assembly of Nickel Hydride Secondary Battery

The obtained positive electrode 24 and the negative electrode 26 were wound in whorl with the separator 28 sandwiched therebetween so that the electrode group 22 was manufactured. The separator 28 used for manufacturing the electrode group 22 here is made from polypropylene fiber non-woven fabric for which sulfonation treatment is performed, and its thickness was 0.1 mm (weight 53 g/m2).

The above-described electrode group 22 was housed in the outer can 10 having a cylindrical shape with a bottom, and a predetermined amount of an alkaline electrolyte solution made from 30 mass % of a NaOH aqueous solution containing KOH and LiOH was injected thereinto. After that, the opening of the outer can 10 was closed by the cover plate 14 or the like, and AA sized nickel hydride secondary battery 2 having nominal capacity of 2000 mAh was assembled. The nickel hydride secondary battery is referred to as a battery a. It is to be noted that 10 batteries a were manufactured.

(4) Initial Activation Treatment

With respect to the battery a, initial activation treatment in which the battery was charged at a temperature of 25° C. with a charge current of 200 mA (0.1 C) for 16 hours, and then, was discharged until the battery voltage became 0.5 V with a discharge current of 400 mA (0.2 C) was repeated twice. In this manner, the battery a was made to be in an enable condition.

Examples 2 to 9

Nickel hydride secondary batteries (batteries b, c, d, e, f, g, h, i) were manufactured in the same manner as the battery a of Example 1, except that, when preparing the negative-electrode mixture slurry, the amount of the thickening agent to be added, the kind of the negative-electrode additive agent to be added, and the amount thereof were set as shown in Table 1.

Example 10

A nickel hydride secondary battery (battery j) was manufactured in the same manner as the battery a of Example 1, except that, when preparing the negative-electrode mixture slurry, a hydrogen absorbing alloy having the composition of $(La_{0.40}Sm_{0.59}Zr_{0.01})_{0.88}Mg_{0.12}Ni_{3.30}Al_{0.20}$ was used, and the amount of the thickening agent to be added, the kind of the negative-electrode additive agent to be added, and the amount thereof were set as shown in Table 1.

In also Examples 2 to 10, the hydrogen-ion exponent (pH) of the negative-electrode mixture slurry was measured. The result is that pH was 8 when the kind of the negative-electrode additive agent is calcium fluoride ($CaF_2$), pH was 8 when the kind of the negative-electrode additive agent is calcium sulfide (CaS), and pH was 8 when the kind of the negative-electrode additive agent is calcium chloride ($CaCl_2$).

Comparative Example 1

A nickel hydride secondary battery (battery k) was tried to be manufactured in the same manner as the battery a of Example 1, except that the negative-electrode additive agent was changed to calcium hydroxide ($Ca(OH)_2$) and the amount of the thickening agent to be added was set as shown in Table 1. However, since the viscosity of the negative-electrode mixture slurry significantly decreased, the negative electrode could not be manufactured and the battery could not be formed.

Comparative Example 2

A nickel hydride secondary battery (battery l) was manufactured in the same manner as the battery k of Comparative Example 1, except that the additive amount of the thickening agent was set as shown in Table 1.

In Comparative Examples 1, 2 in which the kind of the negative-electrode additive agent is calcium hydroxide ($Ca(OH)_2$), the hydrogen-ion exponent (pH) of the negative-electrode mixture slurry was measured. The result is that pH was 11.

2. Evaluation Test of Nickel Hydride Secondary Battery (1) Self-Discharge Characteristics The batteries a to l after the initial activation treatment were charged under an atmosphere of 25° C. with a charge current of 2000 mA (1.0 C) for 1 hour, and then, were left under an atmosphere of 60° C. for 1 month (corresponding to being left at room temperature for 1 year). Then, the batteries after having been left were discharged until the battery voltage became 0.8 V with a discharge current of 2000 mA (1.0 C) under an atmosphere of 25° C. Discharge capacity of the batteries at this time was measured. The discharge capacity at this time is defined as capacity after being left. In each of the batteries, 10 batteries were subjected to this test, and an average value of the capacity after being left was determined. In each of the batteries, a relative value in the case where the capacity after being left of the battery 1 in Comparative Example 2 is defined as 100 mAh is shown in Table 2 as the average value of the capacity after being left. It is to be noted that, a battery having a larger average value of the capacity after being left shows that self-discharge is unlikely to occur even when having been left for a long time and self-discharge characteristics are better. Moreover, the standard deviation of the above-described capacity after being left was determined, and the obtained result is shown in Table 2 as a dispersion value of the capacity after being left. A larger dispersion value shows that more batteries having a large difference from the average value of the capacity after being left are included.

(2) Cycle Lifetime Characteristics

The batteries a to l after the initial activation treatment were charged under an atmosphere of 25° C. with a charge current of 2000 mA (1.0 C) for 1 hour, and then, were left for 20 minutes.

The batteries were discharged until the battery voltage became 1.0 V with a discharge current of 2000 mA (1.0 C) under the same atmosphere, and then, were left for 10 minutes.

When the above-described charge-discharge cycle is defined as 1 cycle, and initial capacity is defined as 100% in each of the batteries, the cycle number until a capacity retention ratio with respect to the initial capacity fell below 60% was counted, and the number was defined as a cycle lifetime. In each of the batteries, 10 batteries were subjected to this test, and an average value of the cycle lifetime was determined. In each of the batteries, a relative value in the case where the cycle number when the battery 1 of Comparative Example 2 reaches the cycle lifetime is defined as 100 is shown in Table 2 as the average value of the cycle lifetime. Moreover, the standard deviation of the above-described cycle lifetime was determined, and the obtained result is shown in Table 2 as a dispersion value of the cycle lifetime. A larger dispersion value shows that more batteries having a large difference from the average value of the cycle lifetime are included.

TABLE 2

| Battery | Capacity after being left | | Cycle lifetime | |
| --- | --- | --- | --- | --- |
| | Average value (mAh) | Dispersion value | Average value (times) | Dispersion value |
| a | 125 | 10 | 110 | 11 |
| b | 125 | 4 | 109 | 5 |
| c | 135 | 4 | 105 | 5 |
| d | 137 | 4 | 100 | 5 |
| e | 118 | 5 | 101 | 5 |
| f | 120 | 4 | 99 | 5 |
| g | 100 | 4 | 100 | 5 |
| h | 103 | 4 | 102 | 4 |
| i | 138 | 4 | 95 | 4 |
| j | 180 | 3 | 140 | 4 |
| k | X | | X | |
| l | 100 | 9 | 100 | 10 |

(3) Discussion

In Comparative Example 1 (battery k), the battery could not be formed. This is because calcium hydroxide ($Ca(OH)_2$) that is a calcium compound showing alkalinity when being dissolved in water was used when the negative-electrode mixture slurry was prepared, and thus the function of the thickening agent was inhibited, the negative-electrode mixture slurry having an appropriate viscosity could not be obtained, and the negative electrode could not be formed. When the negative electrode is tried to be manufactured by using calcium hydroxide ($Ca(OH)_2$) as the negative-electrode additive agent for suppressing self-discharge, a large amount of thickening agent needs to be added as with the battery 1 of Comparative Example 2. If the amount of the thickening agent supported by the negative electrode increases, the amount of the hydrogen absorbing alloy relatively decreases, thereby resulting in decrease in capacity of the battery. In addition, by applying a current, the thickening agent is oxidized in the battery to be decomposed and the hydrogen absorbing alloy absorbs generated hydrogen, and thus, the absorbing amount of hydrogen contributing to a charge-discharge reaction decreases. Therefore, the battery cannot maintain capacity, and thereby resulting in an adverse effect of decrease in self-discharge characteristics.

In contrast, the battery a of Example 1 can be formed and has better self-discharge characteristics than that of the battery 1 of Comparative Example 2. This is because the negative-electrode additive agent contained in the negative electrode of the battery a is calcium fluoride ($CaF_2$), calcium

TABLE 1

| Battery | Hydrogen absorbing alloy | Thickening agent | | Negative-electrode additive agent (calcium compound) | |
| --- | --- | --- | --- | --- | --- |
| | | Kind | Amount (parts by mass) | Kind | Amount (parts by mass) |
| a | $La_{0.60}Ce_{0.30}Pr_{0.05}Nd_{0.05}Ni_{3.90}Co_{0.60}Mn_{0.40}Al_{0.35}$ | Na polyacrylate | 0.01 | $CaF_2$ | 0.1 |
| b | $La_{0.60}Ce_{0.30}Pr_{0.05}Nd_{0.05}Ni_{3.90}Co_{0.60}Mn_{0.40}Al_{0.35}$ | Na polyacrylate | 0.05 | $CaF_2$ | 0.1 |
| c | $La_{0.60}Ce_{0.30}Pr_{0.05}Nd_{0.05}Ni_{3.90}Co_{0.60}Mn_{0.40}Al_{0.35}$ | Na polyacrylate | 0.05 | $CaF_2$ | 0.5 |
| d | $La_{0.60}Ce_{0.30}Pr_{0.05}Nd_{0.05}Ni_{3.90}Co_{0.60}Mn_{0.40}Al_{0.35}$ | Na polyacrylate | 0.05 | $CaF_2$ | 1.0 |
| e | $La_{0.60}Ce_{0.30}Pr_{0.05}Nd_{0.05}Ni_{3.90}Co_{0.60}Mn_{0.40}Al_{0.35}$ | Na polyacrylate | 0.05 | $CaS$ | 0.5 |
| f | $La_{0.60}Ce_{0.30}Pr_{0.05}Nd_{0.05}Ni_{3.90}Co_{0.60}Mn_{0.40}Al_{0.35}$ | Na polyacrylate | 0.05 | $CaCl_2$ | 0.5 |
| g | $La_{0.60}Ce_{0.30}Pr_{0.05}Nd_{0.05}Ni_{3.90}Co_{0.60}Mn_{0.40}Al_{0.35}$ | Na polyacrylate | 0.10 | $CaF_2$ | 0.1 |
| h | $La_{0.60}Ce_{0.30}Pr_{0.05}Nd_{0.05}Ni_{3.90}Co_{0.60}Mn_{0.40}Al_{0.35}$ | Na polyacrylate | 0.05 | $CaF_2$ | 0.05 |
| i | $La_{0.60}Ce_{0.30}Pr_{0.05}Nd_{0.05}Ni_{3.90}Co_{0.60}Mn_{0.40}Al_{0.35}$ | Na polyacrylate | 0.05 | $CaF_2$ | 2.0 |
| j | $(La_{0.40}Sm_{0.59}Zr_{0.01})_{0.88}Mg_{0.12}Ni_{3.30}Al_{0.20}$ | Na polyacrylate | 0.05 | $CaF_2$ | 0.5 |
| k | $La_{0.60}Ce_{0.30}Pr_{0.05}Nd_{0.05}Ni_{3.90}Co_{0.60}Mn_{0.40}Al_{0.35}$ | Na polyacrylate | 0.10 | $Ca(OH)_2$ | 0.1 |
| l | $La_{0.60}Ce_{0.30}Pr_{0.05}Nd_{0.05}Ni_{3.90}Co_{0.60}Mn_{0.40}Al_{0.35}$ | Na polyacrylate | 0.20 | $Ca(OH)_2$ | 0.1 | fluoride (CaF$_2$) does not show alkalinity when being dissolved in water, the function of the thickening agent is not impaired, and the negative-electrode mixture slurry having an appropriate viscosity can be obtained. That is, since, in Example 1, the negative-electrode mixture slurry having an appropriate viscosity can be obtained even by a smaller amount of the thickening agent than that of the battery 1 of Comparative Example 2, the battery can be manufactured. In this manner, the battery a requires a smaller amount of the thickening agent, and thus, can contain a larger amount of the hydrogen absorbing alloy. Therefore, the battery with high capacity as designed can be obtained without decreasing capacity of the battery. This is the same for the batteries b to j having a smaller additive amount of the thickening agent than that of the battery 1, and the battery with high capacity as designed can be obtained without decreasing capacity of the battery. In addition, in the battery a, improvement in self-discharge characteristics of the battery is achieved by the function of calcium fluoride (CaF$_2$). Furthermore, since the amount of the thickening agent is small, the above-described adverse effect on self-discharge characteristics can be minimized. Therefore, the battery a can maintain high capacity after having been left for a long time, and excels in self-discharge characteristics.

Next, according to Example 1 (battery a), Example 2 (battery b), and Example 7 (battery g), it is found that the amount of the thickening agent injected in the negative-electrode mixture slurry is preferably 0.05 parts by mass or less with respect to 100 parts by mass of the hydrogen absorbing alloy. When the amount of the thickening agent is increased, the adverse effect on self-discharge characteristics is caused as described above, and thus, the effect of calcium fluoride as the negative-electrode additive agent decreases. This is clear from the fact that the capacity after being left in Example 7 (battery g) having the amount of the thickening agent larger than Example 1 (battery a) and Example 2 (battery b) is smaller than the capacities after being left in Example 1 (battery a) and Example 2 (battery b). Therefore, the amount of the thickening agent is preferably 0.05 parts by mass or less. In the range with less adverse effect of the thickening agent on self-discharge characteristics of the battery, the larger the amount of the thickening agent is, the smaller the dispersion value of the capacity after being left is. That is, the dispersion value of Example 2 (battery b) is smaller than the dispersion value of Example 1 (battery a). This is because, if the viscosity of the negative-electrode mixture slurry increases when manufacturing the negative electrode, it becomes more difficult for the negative-electrode mixture slurry applied to the negative-electrode substrate to be dripped, and as a result, the amount of the hydrogen absorbing alloy contained in the negative electrode stabilizes.

Next, according to Example 2 (battery b), Example 3 (battery c), Example 4 (battery d), Example 8 (battery h), and Example 9 (battery i), it is found that, the amount of the calcium compound as the negative-electrode additive agent is preferably 0.1 to 1.0 parts by mass with respect to 100 parts by mass of the hydrogen absorbing alloy. When the amount of the negative-electrode additive agent is smaller than 0.1 parts by mass, the effect of improving self-discharge characteristics decreases. Therefore, the lower limit of the amount of the negative-electrode additive agent is preferably 0.1 parts by mass. In contrast, when the amount of the negative-electrode additive agent increases, the amount of the hydrogen absorbing alloy relatively decreases, thereby resulting in decrease in capacity. In particular, when the amount of the negative-electrode additive agent exceeds 1.0 part by mass, self-discharge characteristics is good, but cycle lifetime characteristics decrease. Thus, in order to put cycle lifetime characteristics of the battery into a good state in conjunction with increase in capacity of the battery and improvement in self-discharge characteristics, the upper limit of the negative-electrode additive agent is preferably 1.0 part by mass.

Next, in Example 5 (battery e) and Example 6 (battery f), the kind of the calcium compound as the negative-electrode additive agent was changed. Accordingly, it is found that, in the case of calcium sulfide (CaS) and calcium chloride (CaCl$_2$), cycle lifetime is similar to that of Comparative Example 2 (battery 1), but self-discharge characteristics are improved. Therefore, it can be said that, as the negative-electrode additive agent, calcium sulfide and calcium chloride are effective in improving self-discharge characteristics in addition to calcium fluoride.

Next, in Example 10 (battery j), the kind of the hydrogen absorbing alloy was changed to the hydrogen absorbing alloy having a composition represented by the general formula (I): Ln$_{1-w}$Mg$_w$Ni$_{x-y-z}$Al$_y$T$_z$, wherein Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and w, x, y, and z represent 0<w<0.3, 3.00≤x≤3.80, 0.10≤y≤0.25, and 0≤z≤0.1, respectively. More specifically, the hydrogen absorbing alloy represented by (La$_{0.40}$Sm$_{0.59}$Zr$_{0.01}$)$_{0.88}$Mg$_{0.12}$Ni$_{3.30}$Al$_{0.20}$ was used. According to the battery j using this hydrogen absorbing alloy, it is found that self-discharge characteristics and cycle lifetime characteristics are further improved compared to those of Comparative Example 2 (battery 1). It is considered that this is because a synergy effect of properties described as follows by the hydrogen absorbing alloy represented by the above-described general formula (I) is obtained. That is, firstly, the hydrogen absorbing alloy represented by the general formula (I) has a property that, since the value of the index z representing the amount of the element represented by T is small or 0.1 or less, a constituent that is eluted into the electrolyte solution in the battery is small and a reaction for preventing the self-discharge characteristics improving effect of the calcium compounds as the negative-electrode additive agent is unlikely to occur. Moreover, in the hydrogen absorbing alloy containing Mg and having the value of the index x within the range from 3.00 to 3.80, as the hydrogen absorbing alloy represented by the above-described general formula (I), its crystal structure is a so-called superlattice structure that is a Ce$_2$Ni$_7$ structure. The hydrogen absorbing alloy having such a structure has a property that pulverization due to absorbing and releasing of hydrogen is unlikely to proceed. Therefore, the good battery whose cycle lifetime characteristics are also improved in addition to coexistence of self-discharge characteristics and increase in capacity can be obtained. Therefore, in the present invention, the hydrogen absorbing alloy having a composition represented by the general formula (I): Ln$_{1-w}$Mg$_w$Ni$_{x-y-z}$Al$_y$T$_z$, wherein Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and w, x, y, and z represent 0<w<0.3, 3.00≤x≤3.80, 0.10≤y≤0.25, and 0≤z≤0.1, respectively) is preferably used.

As described above, according to the present invention, in the negative electrode of the nickel hydride secondary battery, by adding the calcium compound not showing alkalinity when being dissolved in water to the negative-electrode mixture slurry, the negative electrode can be successfully manufactured with a small amount of the thickening agent and self-discharge of the battery can be suppressed, and thus, the industrial value is extremely high.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nickel hydride secondary battery comprising:
    a container; and
    an electrode group housed in the container with an alkaline electrolyte solution in an air-tightly closed state, wherein
    the electrode group comprises a positive electrode and a negative electrode which are overlapped with each other via a separator,
    the negative electrode comprises a hydrogen absorbing alloy, a negative-electrode additive agent, a thickening agent, and a conductive material, and
    the negative-electrode additive agent comprises at least one selected from calcium fluoride, calcium sulfide, and calcium chloride.

2. The nickel hydride secondary battery according to claim 1, wherein
    an additive amount of the negative-electrode additive agent is 0.1 to 1.0 parts by mass with respect to 100 parts by mass of the hydrogen absorbing alloy.

3. The nickel hydride secondary battery according to claim 1, wherein
    the thickening agent comprises at least one selected from carboxymethylcellulose, sodium polyacrylate, and hydroxypropylcellulose.

4. The nickel hydride secondary battery according to claim 1, wherein
    an additive amount of the negative-electrode additive agent is 0.1 to 1.0 parts by mass with respect to 100 parts by mass of the hydrogen absorbing alloy, and
    the thickening agent comprises at least one selected from carboxymethylcellulose, sodium polyacrylate, and hydroxypropylcellulose.

5. The nickel hydride secondary battery according to claim 1, wherein
    an additive amount of the thickening agent is 0.01 to 0.1 parts by mass with respect to 100 parts by mass of the hydrogen absorbing alloy.

6. The nickel hydride secondary battery according to claim 1, wherein
    an additive amount of the negative-electrode additive agent is 0.1 to 1.0 parts by mass with respect to 100 parts by mass of the hydrogen absorbing alloy, and
    an additive amount of the thickening agent is 0.01 to 0.1 parts by mass with respect to 100 parts by mass of the hydrogen absorbing alloy.

7. The nickel hydride secondary battery according to claim 1, wherein
    an additive amount of the negative-electrode additive agent is 0.1 to 1.0 parts by mass with respect to 100 parts by mass of the hydrogen absorbing alloy,
    the thickening agent comprises at least one selected from carboxymethylcellulose, sodium polyacrylate, and hydroxypropylcellulose, and
    an additive amount of the thickening agent is 0.01 to 0.1 parts by mass with respect to 100 parts by mass of the hydrogen absorbing alloy.

8. The nickel hydride secondary battery according to claim 1, wherein
    the hydrogen absorbing alloy has a composition represented by a general formula: $Ln_{1-w}Mg_wNi_{x-y-z}Al_yT_z$, wherein Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and w, x, y, and z represent $0<w<0.3$, $3.00 \leq x \leq 3.80$, $0.10 \leq y \leq 0.25$, and $0 \leq z \leq 0.1$, respectively.

9. The nickel hydride secondary battery according to claim 1, wherein
    an additive amount of the negative-electrode additive agent is 0.1 to 1.0 parts by mass with respect to 100 parts by mass of the hydrogen absorbing alloy, and
    the hydrogen absorbing alloy has a composition represented by a general formula: $Ln_{1-w}Mg_wNi_{x-y-z}Al_yT_z$, wherein Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and w, x, y, and z represent $0<w<0.3$, $3.00 \leq x \leq 3.80$, $0.10 \leq y \leq 0.25$, and $0 \leq z \leq 0.1$, respectively.

10. The nickel hydride secondary battery according to claim 1, wherein
    an additive amount of the negative-electrode additive agent is 0.1 to 1.0 parts by mass with respect to 100 parts by mass of the hydrogen absorbing alloy,
    the thickening agent comprises at least one selected from carboxymethylcellulose, sodium polyacrylate, and hydroxypropylcellulose, and
    the hydrogen absorbing alloy has a composition represented by a general formula: $Ln_{1-w}Mg_wNi_{x-y-z}Al_yT_z$, wherein Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and w, x, y, and z represent $0<w<0.3$, $3.00 \leq x \leq 3.80$, $0.10 \leq y \leq 0.25$, and $0 \leq z \leq 0.1$, respectively.

11. The nickel hydride secondary battery according to claim 1, wherein
    an additive amount of the negative-electrode additive agent is 0.1 to 1.0 parts by mass with respect to 100 parts by mass of the hydrogen absorbing alloy,
    the thickening agent comprises at least one selected from carboxymethylcellulose, sodium polyacrylate, and hydroxypropylcellulose,
    an additive amount of the thickening agent is 0.01 to 0.1 parts by mass with respect to 100 parts by mass of the hydrogen absorbing alloy, and
    the hydrogen absorbing alloy has a composition represented by a general formula: $Ln_{1-w}Mg_wNi_{x-y-z}Al_yT_z$, wherein Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and w, x, y, and z represent $0<w<0.3$, $3.00 \leq x \leq 3.80$, $0.10 \leq y \leq 0.25$, and $0 \leq z \leq 0.1$, respectively.

12. The nickel hydride secondary battery according to claim 1, wherein
    the conductive material comprises carbon black.

13. The nickel hydride secondary battery according to claim 1, wherein
    an additive amount of the negative-electrode additive agent is 0.1 to 1.0 parts by mass with respect to 100 parts by mass of the hydrogen absorbing alloy, and
    the conductive material comprises carbon black.

14. The nickel hydride secondary battery according to claim 1, wherein
an additive amount of the negative-electrode additive agent is 0.1 to 1.0 parts by mass with respect to 100 parts by mass of the hydrogen absorbing alloy,
the thickening agent comprises at least one selected from carboxymethylcellulose, sodium polyacrylate, and hydroxypropylcellulose, and
the conductive material comprises carbon black.

15. The nickel hydride secondary battery according to claim 1, wherein
an additive amount of the negative-electrode additive agent is 0.1 to 1.0 parts by mass with respect to 100 parts by mass of the hydrogen absorbing alloy,
the thickening agent comprises at least one selected from carboxymethylcellulose, sodium polyacrylate, and hydroxypropylcellulose,
an additive amount of the thickening agent is 0.01 to 0.1 parts by mass with respect to 100 parts by mass of the hydrogen absorbing alloy, and
the conductive material comprises carbon black.

16. The nickel hydride secondary battery according to claim 1, wherein
an additive amount of the negative-electrode additive agent is 0.1 to 1.0 parts by mass with respect to 100 parts by mass of the hydrogen absorbing alloy,
the thickening agent comprises at least one selected from carboxymethylcellulose, sodium polyacrylate, and hydroxypropylcellulose,
an additive amount of the thickening agent is 0.01 to 0.1 parts by mass with respect to 100 parts by mass of the hydrogen absorbing alloy,
the hydrogen absorbing alloy has a composition represented by a general formula: $Ln_{1-w}Mg_wNi_{x-y-z}Al_yT_z$, wherein Ln represents at least one element selected from a lanthanoid element, Ca, Sr, Sc, Y, Yb, Er, Ti, Zr, and Hf, T represents at least one element selected from V, Nb, Ta, Cr, Mo, Mn, Fe, Co, Ga, Zn, Sn, In, Cu, Si, P, and B, and w, x, y, and z represent $0<w<0.3$, $3.00\leq x\leq 3.80$, $0.10\leq y\leq 0.25$, and $0\leq z\leq 0.1$, respectively), and
the conductive material comprises carbon black.

* * * * *